Patented Jan. 3, 1939

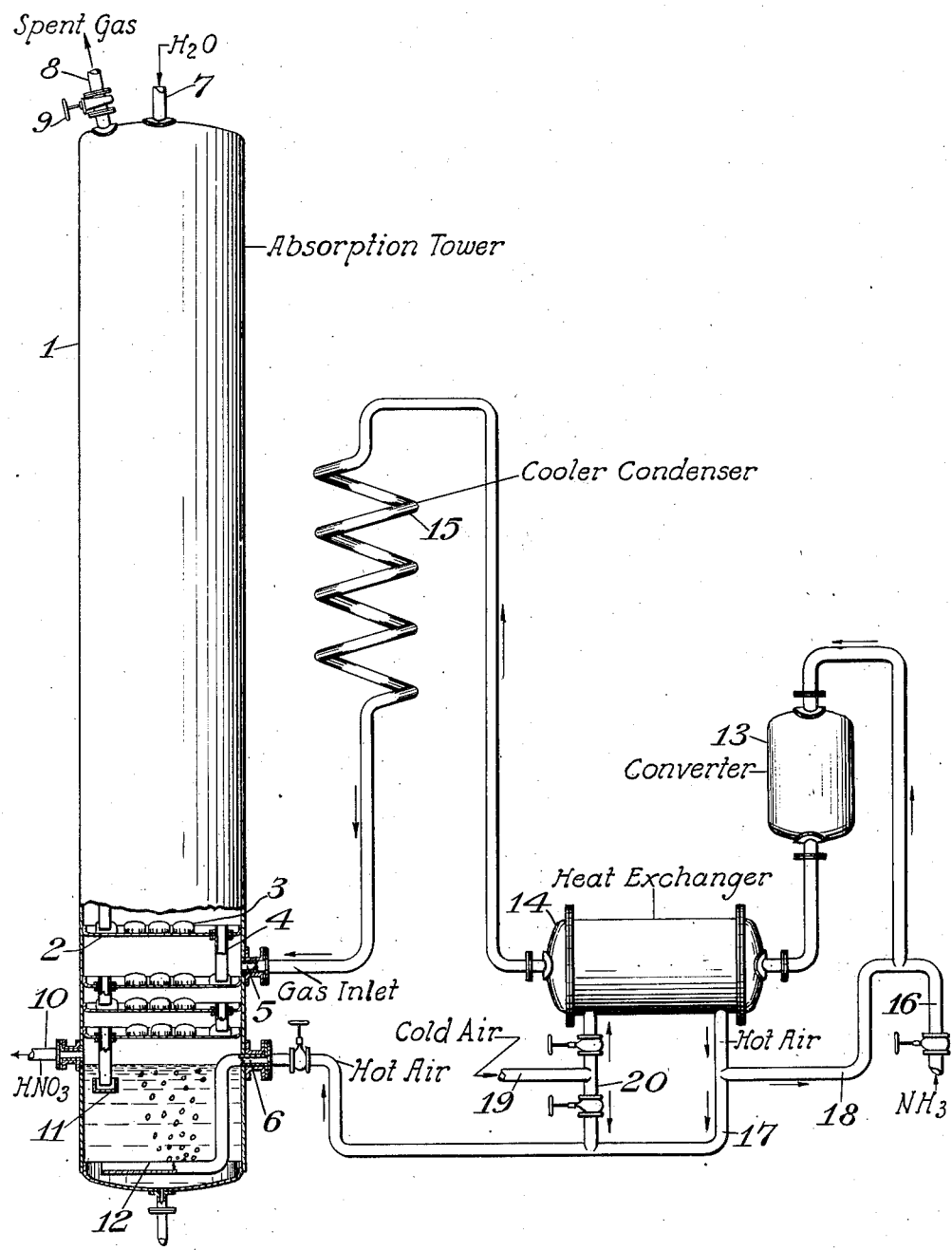

2,142,646

UNITED STATES PATENT OFFICE 2,142,646

PRODUCTION OF NITRIC ACID

Stanley L. Handforth, Gordon Heights, Del., and John N. Tilley, Woodbury, N. J., assignors to E. I. du Pont de Nemours & Company, Wilmington, Del., a corporation of Delaware Application May 24, 1935, Serial No. 23,184

4 Claims. (Cl. 23—160)

The present invention relates to the production of nitric acid by the oxidation of ammonia, and more particularly, to a new and improved process for producing nitric acid free from color by the ammonia oxidation process.

In the manufacture of nitric acid by processes involving the oxidation of ammonia, this is first converted into oxides of nitrogen, particularly nitric oxide, $NO_2$. These oxides are subsequently converted into nitric acid by reaction with oxygen-containing gases and water. This latter step is customarily carried out in absorption towers by a counter-current absorption system wherein the gases pass upward and come in contact with a down-flowing stream of water or dilute nitric acid.

The nitric acid formed by the foregoing process has a concentration varying usually from around 50 to 65%, depending on the pressure under which the oxidation is carried out and on other conditions. The acid, however, commonly has a small content of nitric oxide which is objectionable for many purposes for which the acid is used and which causes a coloring of the acid. The presence of $NO_2$ in the acid has been particularly noticeable under conditions of cold weather and in the case of oxidation processes using pressures above atmospheric.

The object of the present invention is a new and improved process for producing nitric acid by the oxidation of ammonia. A further object is an improved process for producing nitric acid substantially free from $NO_2$ content. A still further object is a rational method of producing nitric acid free from color by the ammonia oxidation process. Other objects of our invention will become apparent as the invention is further disclosed hereinafter.

We have found that the foregoing objects are accomplished by bringing into contact with the nitric acid, containing $NO_2$, air that has been preheated by heat exchange with the gaseous products resulting from the oxidation of ammonia. Since these gases are at a very high temperature, the utilization of this heat results in greatly increased operating officiency. The heated air is brought directly into contact with a body of nitric acid and preferably is introduced beneath the surface of said body.

The heated air may be introduced into the acid at varying temperatures up to above 300° C., and preferably this temperature is so selected that the body of acid in the tower heel is maintained at a temperature of 15 to 50° C. The temperature of the heated air will depend, therefore, on the dimensions of the absorption tower and the amount of acid contained therein. We have found, for example, that under certain conditions air preheated to 100° C. would maintain the tower heel of acid at 25° C., 64% $HNO_3$ being readily obtained containing about 0.22% $NO_2$. By raising the temperature of the air to 250 to 300° C., the temperature of the acid was maintained at 60 to 70° C., and under such conditions water-white nitric acid resulted, free from $NO_2$. Generally speaking, however, a temperature of 50° C. for the tower acid is considered sufficient.

In order to describe our invention more clearly, we shall refer to the accompanying diagram which illustrates a preferred method of carrying out the process. This is intended, however, for illustrative purposes only, and is not to be regarded as a limitation of the scope of our invention.

Referring to the single figure of the drawing, a conventional absorption tower 1, shown partly in section and partly in elevation, is provided with a plurality of bubbler cap trays 2, containing bubbler caps 3 mounted thereon and having overflow pipes 4 for conducting liquid to the next lower tray. The tower is also provided with a gas inlet 5 for the incoming oxides of nitrogen, an air-inlet 6 connected to a distributor 12 for admitting the bleaching air, a water-supply inlet 7 at the top, and, at the top also, a spent-gas outlet 8 provided with a suitable valve 9. The acid is drawn off at the bottom of the tower through the outlet 10.

The absorption tower is connected to the ammonia oxidation system as follows: The converter 13 is connected through the heat exchanger 14 and cooler condenser 15 to the gas inlet 5. Air at atmospheric temperature, supplied through line 19, is passed through the heat exchanger 14, part of it is diverted through line 18 into the converter 13, and the remainder, passing through line 17, is introduced below the surface of the acid heel in the absorption tower through the distributor 12. If desired, the temperature of the heated bleaching air is regulated by dilution with a suitable amount of cold air, introduced through the line 20.

In operation, the gaseous ammonia or ammonia-bearing gases are introduced into the system through the line 16 and are mixed with heated air from the converter 14, supplied through the lines 17 and 18. The mixture is then passed through the converter 13. The hot nitrogen oxides pass through the converter 14 and the cooler condenser 15 to the gas-inlet 5 of the absorption tower. As the oxides of nitrogen rise in the tower, they are absorbed in the counter-current of aqueous nitric acid, which collects as 64% nitric acid in the tower heel, where it is drawn off continuously through 10.

Simultaneously, air at atmospheric temperature, entering the system through line 19, is passed through the heat exchanger 14, and part of the hot air is diverted from the converter line 18 into the line 17, leading to the distributor 12. For the purpose of regulating the temperature of the bleaching air, the hot air is diluted with suitable amounts of cold air, introduced through the line 20. In this manner the temperature of the bleaching air may be regulated very closely. The heated air, introduced through 12, bubbles up through the heel of acid in the tower, carrying with it the dissolved $NO_2$ vapors. The air and $NO_2$ rise through the bubbler caps, the $NO_2$ is absorbed in the down-flowing nitric acid, while the air passes out of the system.

If water-white nitric acid is desired, the relative amounts of the cold and hot air are regulated so that the air entering the distributor 12 is at a temperature sufficient to maintain the acid body at the base of the tower at a temperature around 50° C. If an acid containing small amounts of $NO_2$ is satisfactory, the temperature of the acid need not be raised as high. By this efficient means, the $NO_2$ content of the effluent nitric acid may be avoided or closely regulated to small amounts.

While we have now described an actual embodiment of our process in detail, it is to be understood that our invention is not to be restricted thereto, since it will be apparent from the foregoing that many variations in details will suggest themselves to those skilled in the art without departing from the spirit and scope of our invention. We, therefore, intend to be limited only in accordance with the following patent claims.

We claim:

1. The process according to claim 3, in which the heated oxygen-containing gas is at such a temperature that the body of acid is maintained at a temperature between 15 and 50° C.

2. The process of claim 3, wherein the oxygen-containing gas is introduced at a temperature in excess of 100° C. into contact with the body of nitric acid.

3. In the process for producing nitric acid by the oxidation of ammonia, the steps which comprise oxidizing ammonia with an oxygen-containing gas, absorbing the resulting vaporous nitrogen oxides and converting them to nitric acid by contacting them with water and an oxygen-containing gas, maintaining a body of nitric acid containing dissolved $NO_2$, bringing an oxygen-containing gas into indirect heat exchange with the hot gaseous products of the ammonia oxidation, and subsequently introducing said heated oxygen-containing gas beneath the surface of said body of nitric acid, whereby substantially all of the $NO_2$ content of said nitric acid is removed.

4. The process of producing substantially colorless nitric acid which comprises oxidizing ammonia with an oxygen-containing gas, absorbing the resulting vaporous nitrogen oxides and converting them to nitric acid by contacting them with water and an oxygen-containing gas, maintaining a body of said nitric acid containing dissolved $NO_2$, bringing an oxygen-containing gas into indirect heat exchange with the hot gaseous products of the ammonia oxidation and introducing said heated oxygen-containing gas beneath the surface of said body of nitric acid, thereby maintaining said acid body at a temperature not substantially below 50° C., whereby substantially all the $NO_2$ content is removed from said acid.

STANLEY L. HANDFORTH.
JOHN N. TILLEY.